US009006333B2

(12) United States Patent
Miyamoto et al.

(10) Patent No.: US 9,006,333 B2
(45) Date of Patent: Apr. 14, 2015

(54) METHOD FOR MANUFACTURING FINE POLYTETRAFLUOROETHYLENE POWDER (75) Inventors: Masayoshi Miyamoto, Settsu (JP); Taku Yamanaka, Settsu (JP); Yasuhiko Sawada, Settsu (JP); Masayuki Tsuji, Settsu (JP)

(73) Assignee: Daikin Industries, Ltd., Osaka (JP)

(*) Notice: Subject to any disclaimer, the term of this patent is extended or adjusted under 35 U.S.C. 154(b) by 0 days.

(21) Appl. No.: 13/876,361

(22) PCT Filed: Sep. 29, 2011

(86) PCT No.: PCT/JP2011/072453
§ 371 (c)(1),
(2), (4) Date: Mar. 27, 2013

(87) PCT Pub. No.: WO2012/043757
PCT Pub. Date: Apr. 5, 2012

(65) Prior Publication Data
US 2013/0184401 A1    Jul. 18, 2013

(30) Foreign Application Priority Data
Sep. 30, 2010 (JP) ................... 2010-223149

(51) Int. Cl.
C08J 3/16 (2006.01)
C08F 14/26 (2006.01)
(52) U.S. Cl.
CPC ............... *C08J 3/16* (2013.01); *C08J 2327/18* (2013.01)
(58) Field of Classification Search
USPC ................................... 524/546, 545
See application file for complete search history.

(56) References Cited

U.S. PATENT DOCUMENTS

| 2,075,628 | A | * | 3/1937 | Sekavec | ............................. 68/54 |
| 2,593,583 | A | * | 4/1952 | Lontz | ........................ 528/502 F |
| 4,107,232 | A |   | 8/1978 | Haaf et al. | |
| 4,355,126 | A |   | 10/1982 | Haaf et al. | |
| 4,368,296 | A |   | 1/1983 | Kuhls et al. | |
| 4,391,935 | A |   | 7/1983 | Bialous et al. | |
| 4,408,007 | A |   | 10/1983 | Kuhls et al. | |
| 4,649,168 | A |   | 3/1987 | Kress et al. | |

(Continued)

FOREIGN PATENT DOCUMENTS

| CA | 1045269 | 12/1978 |
| EP | 0 861 856 A1 | 9/1998 |

(Continued)

OTHER PUBLICATIONS

International Preliminary Report on Patentability, together with the Written Opinion of the International Searching Authority, for PCT/JP2011/072446.

(Continued)

*Primary Examiner* — Peter D. Mulcahy
*Assistant Examiner* — Henry Hu
(74) *Attorney, Agent, or Firm* — Sughrue Mion, PLLC (57) ABSTRACT A method for manufacturing a polytetrafluoroethylene fine powder characterized by including the steps of (1) preparing an aqueous dispersion containing polytetrafluoroethylene, water, and a surfactant (A); (2) coagulating the polytetrafluoroethylene in the aqueous dispersion by agitating the aqueous dispersion with a discharge flow-type impeller; (3) collecting a wet powder of the polytetrafluoroethylene; and (4) drying the wet powder of the polytetrafluoroethylene.

3 Claims, 4 Drawing Sheets (a) 　(b)

(c) 　(d)

(56) References Cited

U.S. PATENT DOCUMENTS

| | | | |
|---|---|---|---|
| 4,751,260 A | 6/1988 | Kress et al. | |
| 4,767,821 A | 8/1988 | Lindner et al. | |
| 4,810,739 A | 3/1989 | Lindner et al. | |
| 4,920,166 A | 4/1990 | Buysch et al. | |
| 4,983,658 A | 1/1991 | Kress et al. | |
| 4,999,115 A * | 3/1991 | Peterson | 210/728 |
| 5,061,745 A | 10/1991 | Wittmann et al. | |
| 5,242,960 A | 9/1993 | Ostlinning et al. | |
| 5,804,654 A | 9/1998 | Lo et al. | |
| 6,300,408 B1 | 10/2001 | Asano et al. | |
| 6,422,736 B1 * | 7/2002 | Antoniades et al. | 366/172.2 |
| 6,503,988 B1 * | 1/2003 | Kitahara et al. | 525/326.2 |
| 7,220,456 B2 * | 5/2007 | Mehta et al. | 427/421.1 |
| 2006/0173100 A1 * | 8/2006 | Lee et al. | 523/216 |
| 2006/0252898 A1 | 11/2006 | Tsuji et al. | |
| 2008/0020159 A1 * | 1/2008 | Taira et al. | 428/35.7 |
| 2008/0275188 A1 | 11/2008 | Park | |
| 2009/0011351 A1 * | 1/2009 | Kikawa et al. | 430/105 |
| 2011/0021728 A1 | 1/2011 | Higuchi et al. | |
| 2011/0040054 A1 | 2/2011 | Higuchi et al. | |
| 2011/0105649 A1 | 5/2011 | Harada et al. | |
| 2011/0196080 A1 | 8/2011 | Matsuoka et al. | |
| 2011/0201730 A1 | 8/2011 | Tsunoda et al. | |
| 2013/0122302 A1 | 5/2013 | Miyamoto et al. | |
| 2013/0184395 A1 * | 7/2013 | Yamanaka et al. | 524/502 |
| 2014/0336315 A1 | 11/2014 | Yamanaka et al. | |

FOREIGN PATENT DOCUMENTS

| | | |
|---|---|---|
| EP | 1 702 932 A1 | 9/2006 |
| EP | 2 623 556 A1 | 8/2013 |
| EP | 2623543 A1 * | 8/2013 |
| EP | 2623556 A1 * | 8/2013 |
| GB | 1 459 648 | 12/1976 |
| JP | 49-115190 A | 11/1974 |
| JP | 50-44241 | 4/1975 |
| JP | 56-131629 A | 10/1981 |
| JP | 59-36657 B2 | 9/1984 |
| JP | 60-38418 B2 | 8/1985 |
| JP | 60-258263 A | 12/1985 |
| JP | 61-55145 A | 3/1986 |
| JP | 61-127759 A | 6/1986 |
| JP | 61-261352 A | 11/1986 |
| JP | 62-58629 B2 | 12/1987 |
| JP | 63-278961 A | 11/1988 |
| JP | 1-60181 B2 | 12/1989 |
| JP | 2-32154 A | 2/1990 |
| JP | 5-186686 A | 7/1993 |
| JP | 5-214184 A | 8/1993 |
| JP | 5-287151 A | 11/1993 |
| JP | 6-306212 A | 11/1994 |
| JP | 7-324147 A | 12/1995 |
| JP | 8-253600 A | 10/1996 |
| JP | 9-95583 A | 4/1997 |
| JP | 10-77378 A | 3/1998 |
| JP | H10-147617 A | 6/1998 |
| JP | 10-259252 A | 9/1998 |
| JP | 10-310707 A | 11/1998 |
| JP | 2005-2322 A | 1/2005 |
| WO | 97/17382 A1 | 5/1997 |
| WO | 2004/074371 A1 | 9/2004 |
| WO | 2006/054612 A1 | 5/2006 |
| WO | 2007/046377 A1 | 4/2007 |
| WO | 2007/049517 A1 | 5/2007 |
| WO | 2009/128432 A1 | 10/2009 |
| WO | 2009/142080 A1 | 11/2009 |
| WO | 2011/055824 A1 | 5/2011 |

OTHER PUBLICATIONS

International Preliminary Report on Patentability, together with the Written Opinion of the International Searching Authority, for PCT/JP2011/072453.

International Preliminary Report on Patentability, together with the Written Opinion of the International Searching Authority, for PCT/JP2011/073039.

International Search Report with a mailing date of Dec. 13, 2011 for PCT/JP2011/073039.

International Search Report with a mailing date of Dec. 27, 2011 for PCT/JP2011/072446.

Non-Final Office Action dated Oct. 17, 2014, issued by the United States Patent and Trademark Office in related U.S. Appl. No. 13/810,323.

Extended European Search Report issued Mar. 2, 2015 for EP Application No. EP 11829431.3 which is a counterpart of related U.S. Appl. No. 13/810,323 (published as U.S. Publication No. 20133/0122302).

Communication dated Feb. 11, 2015, issued by the European Patent Office in European Application No. 11829307.5.

* cited by examiner

METHOD FOR MANUFACTURING FINE POLYTETRAFLUOROETHYLENE POWDER

CROSS REFERENCE TO RELATED APPLICATIONS

This application is a National Stage of International Application No. PCT/JP2011/072453, filed on Sep. 29, 2011, which claims priority from Japanese Patent Application No. 2010-223149, filed on Sep. 30, 2010, the contents of all of which are incorporated herein by reference in their entirety.

TECHNICAL FIELD

The present invention relates to a method for manufacturing a polytetrafluoroethylene fine powder.

BACKGROUND ART

Polytetrafluoroethylene (PTFE) is produced in mainly two types of processes: suspension polymerization and aqueous dispersion (emulsion) polymerization. Aqueous dispersion (emulsion) polymerization provides a latex, and polymer fine particles therein are aggregated and dried to obtain a powder (fine powder), which is then processed by paste extrusion after being compounded mainly with a liquid lubricant. By paste extrusion, the compound is extruded into a form of a rod or a tube from an extruder. The extruded articles are used as sealing materials without being subjected to further processing or by being rolled into a sheet without sintering (calendering), or as filter materials by being stretched into porous films, or are further sintered to be used as molded articles such as tubes, and wire-coatings.

When a high shear force is applied to PTFE aqueous dispersions, primary particles are aggregated and secondary particles having an average particle size of 100 to 1000 μm are formed (coagulation). It is known that in order to promote coagulation, an additive such as acids, alkalis, organic solvents is added. A secondary particle powder obtained by coagulation of PTFE aqueous dispersions is dried to give a PTFE fine powder.

PTFE fine powders are characterized by their fibrillating properties. By paste extrusion or calendering as described above, molded articles such as sealing materials, filters, tubes, pipes, and wire-coatings can be produced.

Although the above properties of PTFE fine powders may be advantageous, some problems may also be caused such that secondary particle powders tend to be aggregated due to fibrillation and that the formed aggregates may not restore themselves to their original secondary particle powders. Because of these problems, PTFE fine powders tend to be aggregated or aggregated to be consolidated during production, transport or molding processes thereof, impairing handling characteristics thereof.

The aggregates may lead to reduced molding properties and deteriorated appearance of molded articles. Thus, it is usually necessary to remove the aggregates with a sieve during production or before molding. They may lead to decreased working efficiency or productivity.

As one of methods for manufacturing a PTFE fine powder which can solve the above problems and is excellent in powder flowability, Patent Literature 1 discloses a method for manufacturing a fine powder having a high apparent density and excellent flowability by adding a fluorine-containing anionic surfactant to a PTFE aqueous dispersion. In Patent Literature 1, coagulation of the PTFE aqueous dispersion is carried out by agitation using an anchor-type impeller.

Patent Literature 2 discloses granulation of a modified PTFE powder obtained by suspension polymerization, which is carried out in a granulation tank equipped with a cone-shaped impeller. Patent Literature 3 discloses suspension polymerization in a 150-L stainless steel polymerization vessel equipped with a cone-shaped impeller. Neither literature discloses, however, coagulation in a PTFE aqueous dispersion obtained by emulsion polymerization, which is carried out by agitation using a cone-shaped impeller.

CITATION LIST

Patent Literature

Patent Literature 1: WO 97/017382
Patent Literature 2: JP 10-259252 A
Patent Literature 3: JP 2005-2322 A

SUMMARY OF INVENTION

Technical Problem

In a conventional coagulation step for obtaining a PTFE fine powder, an anchor-type impeller is used such as in Patent Literature 1, because the anchor-type impeller easier gives a large shear force enabling coagulation. However, when the present inventors focused on the types of the impeller for coagulation, they found out that anchor-type impellers may cause following problems: a fine powder obtained by aggregation of primary particles tends to be broken by local shear forces during coagulation; and huge aggregates with a diameter of at least 1000 μm may be formed by further aggregation of the fine powder. The fine powder broken by a high shear force has irregular shapes which are considered to deteriorate handling characteristics (compressibility, aggregate disintegration degree).

Accordingly, an object of the present invention is to provide a method for manufacturing a PTFE fine powder having superior handling characteristics.

Solution to Problem

The present inventors have unexpectedly found that agitation with a specific impeller, that is, a discharge flow-type impeller, during a coagulation step in the production of a PTFE fine powder improves handling characteristics of the resulting PTFE fine powder.

Thus, the present invention is a method for manufacturing a polytetrafluoroethylene fine powder, the method including the steps of:
(1) preparing an aqueous dispersion containing polytetrafluoroethylene, water and a surfactant (A);
(2) coagulating the polytetrafluoroethylene in the aqueous dispersion by agitation with a discharge flow-type impeller;
(3) collecting a wet powder of the polytetrafluoroethylene; and
(4) drying the wet powder of the polytetrafluoroethylene.

The discharge flow-type impeller is preferably a cone-shaped impeller.

The discharge flow-type impeller is preferably a downward tapering cone-shaped impeller.

Advantageous Effects of Invention

The method of the present invention allows production of a PTFE fine powder having a low compression ratio and a large aggregate disintegration degree as well as superior handling characteristics. According to the present method, the resulting PTFE fine powder has an equivalent apparent density to conventional fine powders.

DESCRIPTION OF EMBODIMENTS

The method of the present invention includes the step (1) of preparing an aqueous dispersion including polytetrafluoroethylene (PTFE), water and a surfactant (A).

The PTFE is fibrillatable and non-melt-fabricable. The PTFE preferably has a standard specific gravity (SSG) of 2.13 to 2.23. The PTFE preferably has a melting point of 325 to 347° C. The melting point is measured by differential scanning calorimetry (DSC) with the heating rate of 10° C./min. The PTFE is preferably PTFE particles with an average primary particle size of 0.05 to 1 μm.

The PTFE may be a tetrafluoro-ethylene (TFE) homopolymer consisting solely of TFE or a modified PTFE composed of TFE and a modifying monomer. The modifying monomer may be any monomer that can be copolymerized with TFE and examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ethers; perfluoroalkyl ethylenes; ethylene; and the like. One or more modifying monomers may be used.

The perfluorovinyl ethers are not specifically limited and examples thereof include perfluorinated unsaturated compounds represented by the following general formula (1):

$$CF_2=CF-ORf \qquad (1)$$

wherein, Rf is a perfluorinated organic group. As used herein, "perfluorinated organic group" means an organic group in which all hydrogen atoms linked to a carbon atom (s) are substituted with fluorine atoms. The perfluorinated organic group may contain an ethereal oxygen atom.

More specific examples of the perfluorovinyl ethers include perfluoro (alkyl vinyl ethers) (PAVE) which correspond to the above general formula (1) wherein Rf is a perfluoroalkyl group having 1 to 10 carbon atoms. The perfluoroalkyl group preferably has 1 to 5 carbon atoms.

Examples of the perfluoroalkyl group in the above PAVE include perfluoromethyl, perfluoroethyl, perfluoropropyl, perfluorobutyl, perfluoropentyl, and perfluorohexyl groups, and the like. A preferable example of the PAVEs is perfluoropropyl vinyl ether (PPVE) which has a perfluoropropyl group as the perfluoroalkyl group. Further examples of the perfluorovinylethers include the ones having the above general formula (1) in which Rf is a perfluoro (alkoxyalkyl) group having 4 to 9 carbon atoms; in which Rf is the group represented by the following formula:

wherein m is 0 or an integer of 1 to 4; and in which Rf is the group represented by the following formula:

wherein n is an integer of 1 to 4 and the like.

The perfluoroalkyl ethylenes are not specifically limited and examples thereof include perfluorobutyl ethylene (PFBE), perfluorohexyl ethylene and the like.

The modifying monomer in the modified PTFE is preferably at least one selected from the group consisting of HFP, CTFE, VDF, PPVE, PFBE and ethylene. It is more preferably at least one selected from the group consisting of HFP and CTFE.

The modified PTFE preferably includes 1% by mass or less, more preferably from 0.001 to 1% by mass of the modifying monomer unit relative to total monomer units therein. As used herein, the modifying monomer unit is the moiety which is a part of the molecular structure of the modified PTFE and is derived from the modifying monomer. The total monomer units mean the moieties which are derived from all monomers in the molecular structure of the modified PTFE.

The surfactant (A) is preferably at least one selected from the group consisting of anionic surfactants, fluorine-containing anionic surfactants, nonionic surfactants, and fluorine-containing nonionic surfactants, and more preferably at least one selected from the group consisting of fluorine-containing anionic surfactants and nonionic surfactants. It is still more preferably a fluorine-containing anionic surfactant. The present method is still efficacious in preparing a PTFE fine powder when polymerization is carried out in the presence of any of the fluorine-containing surfactant (including fluorine-containing anionic surfactants and fluorine-containing nonionic surfactants) having 7 or less or 6 or less carbon atoms as the surfactant (A).

Examples of the fluorine-containing anionic surfactants include carboxylic surfactants, sulfonic surfactants, and the like. The fluorine-containing anionic surfactants are preferably the carboxylic surfactants represented by the following general formula (i), (ii), (iii), (iv), (v), (vi), or (vii).

The fluorine-containing anionic surfactants may be carboxylic surfactants represented by the general formula (i):

$$X-Rf^1COOM^1 \qquad (i)$$

wherein X is H, F or Cl; $Rf^1$ is a linear or branched fluoroalkylene group having 4 to 14, preferably 5 to 7 carbon atoms, for example, a linear or branched fluoroalkylene group having 7 carbon atoms and, inter alia, is a linear or branched perfluoroalkylene group; and $M^1$ is a monovalent alkali metal, $NH_4$, or H.

Examples of the carboxylic surfactants represented by the general formula (i) include $C_5F_{11}COOH$, $C_6F_{13}COOH$, $C_7F_{15}COOH$, and the like, and salts thereof.

The fluorine-containing anionic surfactants may also be carboxylic surfactants represented by the general formula (ii):

wherein $X^1$, $X^2$, $X^3$, $X^4$, and $X^5$ are the same or different from each other and represent H, F, or $CF_3$; $M^1$ is a monovalent alkali metal, $NH_4$, or H; p is 1 or 2; q is 1 or 2; and r is 0 or 1. Examples of the fluoroether carboxylic acids represented by the general formula (ii) include $CF_3OCF(CF_3)CF_2OCF(CF_3)COONH_4$, $CF_3CF_2OCF_2CF_2OCF_2COONH_4$, $CF_3OCF_2CF_2CF_2OCHFCF_2COONH_4$, and the like.

The fluorine-containing anionic surfactants may also be carboxylic surfactants represented by the general formula (iii):

wherein X is H, F, or Cl; m is an integer of 1 to 10, e.g. 5; n is an integer of 0 to 5, e.g. 1; and $M^1$ is a monovalent alkali metal, $NH_4$, or H.

Examples of the carboxylic surfactants represented by the general formula (iii) include $CF_3\text{—}O\text{—}CF(CF_3)CF_2O\text{—}CF(CF_3)COOH$ and the like, and salts thereof.

The fluorine-containing anionic surfactants may also be carboxylic surfactants represented by the general formula (iv):

wherein X, m, n, and $M^1$ are as defined above.

The fluorine-containing anionic surfactants may also be carboxylic surfactants represented by the general formula (v):

wherein X, m, n, and $M^1$ are as defined above.

The fluorine-containing anionic surfactants may also be carboxylic surfactants represented by the general formula (vi):

wherein $Rf^3$ is a partially-fluorinated or perfluorinated alkyl group; $M^1$ is a monovalent alkali metal, $NH_4$, or H; and p is 1 or 2. $Rf^3$ is preferably an alkyl group having 1 to 3 carbon atoms. Examples of the carboxylic surfactants represented by the general formula (vi) include $CF_3CF_2OCF_2CF_2OCF_2COONH_4$, $CF_3CF_2OCF_2CF_2OCF_2COOH$, and the like.

The fluorine-containing anionic surfactants may also be the fluoroether carboxylic acids represented by the general formula (vii):

wherein $Rf^4$ is a linear aliphatic group or a linear aliphatic group to which one or more oxygen atoms are introduced, both aliphatic groups being partially-fluorinated or perfluorinated; and $M^1$ is a monovalent alkali metal, $NH_4$, or H. $Rf^4$ is preferably an aliphatic group having 1 to 3 carbon atoms. Examples of the carboxylic surfactants represented by the general formula (vii) include $CF_3OCF_2CF_2CF_2OCHFCF_2COONH_4$, $CF_3OCF_2CF_2CF_2OCHFCF_2COOH$, and the like.

Thus, preferred is at least one fluorine-containing surfactant selected from the group consisting of: the carboxylic surfactants represented by the general formula (i):

wherein X is H, F, or Cl; $Rf^1$ is a linear or branched fluoroalkylene group having 4 to 14, preferably 5 to 7 carbon atoms; and $M^1$ is a monovalent alkali metal, $NH_4$, or H; the carboxylic surfactants represented by the general formula (ii):

wherein $X^1$, $X^2$, $X^3$, $X^4$ and $X^5$ are the same or different from each other and represent H, F, or $CF_3$; $M^1$ is a monovalent alkali metal, $NH_4$, or H; p is 1 or 2; q is 1 or 2; and r is 0 or 1; the carboxylic surfactants represented by the general formula (iii):

wherein X is H, F, or Cl; m is an integer of 1 to 10; n is an integer of 0 to 5; and $M^1$ is a monovalent alkali metal, $NH_4$, or H;
the carboxylic surfactants represented by the general formula (iv):

wherein X, m, n, and $M^1$ are as defined above; the carboxylic surfactants represented by the general formula (v):

wherein X, m, n, and $M^1$ are as defined above; the carboxylic surfactants represented by the general formula (vi):

wherein $Rf^3$ is a partially-fluorinated or perfluorinated alkyl group; $M^1$ is a monovalent alkali metal, $NH_4$, or H; and p is 1 or 2; and
the carboxylic surfactants represented by the general formula (vii):

wherein $Rf^4$ is a linear aliphatic group or a linear aliphatic group to which one or more oxygen atoms are introduced, both aliphatic groups being partially-fluorinated or perfluorinated; and $M^1$ is a monovalent alkali metal, $NH_4$, or H.

The nonionic surfactants which may be used as the surfactant (A) are not specifically limited so long as they are nonionic surfactants devoid of fluorine atoms. Examples thereof include ether-based nonionic surfactants such as polyoxyethylene alkylphenyl ethers, polyoxyethylene alkyl ethers, and polyoxyethylene alkylene alkyl ethers; polyoxyethylene derivatives such as ethylene oxide/propylene oxide block copolymers; ester-based nonionic surfactants such as sorbitan fatty acid esters, polyoxyethylene sorbitan fatty acid esters, polyoxyethylene sorbitol fatty acid esters, fatty acid esters of glycerol, and polyoxyethylene fatty acid esters; and amine-based nonionic emulsifiers such as polyoxyethylene alkylamines, alkyl alkanolamides; and the like. From the environmental point of view, nonionic surfactants which do not contain any alkyl phenol in their structures are preferably used.

The concentration of the surfactant (A) in the aqueous dispersion is preferably from 0.001 to 10% by mass, and more preferably from 0.005 to 1% by mass relative to the PTFE.

The aqueous dispersion in the step (1) can be prepared by aqueous dispersion polymerization, or by further treating the aqueous dispersion obtained by aqueous dispersion polymerization (emulsion polymerization) by techniques such as ion-exchange treatment, cloud point concentration, electroconcentration, and ultrafiltration.

The aqueous dispersion polymerization can be carried out by applying well-known polymerization techniques which may be carried out with batch, semi-batch, or continuous manners. The above fluorine-containing anionic surfactant, the modifying monomer, a polymerization initiator, a stabilizer, a chain transfer agent, and the like can be continuously or sequentially added during the aqueous dispersion polymerization reaction depending on the desired molecular weight and properties of a target PTFE. The aqueous dispersion polymerization is generally carried out for 0.5 to 50 hours.

The aqueous dispersion polymerization is carried out by using a polymerization initiator with agitation in an aqueous medium and in the presence of the fluorine-containing anionic surfactant in a pressure resistant reactor equipped with an agitator. After charging an aqueous medium, a chain transfer agent, the monomers and an optional stabilizer and adjusting temperature and pressure, the aqueous dispersion polymerization can be initiated by addition of the polymerization initiator.

The aqueous dispersion polymerization can be carried out while feeding a monomer into the aqueous medium. In the aqueous dispersion polymerization, tetrafluoroethylene (TFE) may be only one monomer that is fed, or both TFE and the modifying monomer polymerizable with TFE may be fed.

The aqueous medium is preferably deionized, highly-purified water.

The fluorine-containing anionic surfactant can be fed to the polymerization reaction system by various ways. For example, the entire amount thereof may be fed to the reaction system at one time before the reaction is started, or it can be fed gradually in order to control the size of resulting particles as described in JP 44-14466 A. In order to improve the stability of the aqueous dispersion during the polymerization, it is preferably added during the polymerization sequentially or continuously.

The fluorine-containing anionic surfactant can be generally used, although it may depend on the type of the fluorine-containing anionic surfactant used and the desired primary particle size, in an amount selected from the range from 0.02 to 0.50% by mass relative to the aqueous medium used in the reaction.

For the purpose of stabilization of the dispersion in the reaction system, a stabilizer may optionally be added.

The stabilizer is preferably paraffin wax, fluorine-containing oil, fluorine-containing compounds, silicone oil, and the like which are substantially inert in the reaction, among which paraffin wax is preferred.

The paraffin wax is preferably hydrocarbons having 12 or more carbon atoms and being liquid under reaction conditions, among which hydrocarbons having 16 or more carbon atoms are more preferred. The melting point thereof is preferably from 40 to 65° C., more preferably from 50 to 65° C.

The paraffin wax is preferably used in an amount corresponding to from 1 to 12% by mass, and more preferably from 2 to 8% by mass of the aqueous medium.

In order to adjust the pH of the reaction system during the reaction, a buffering agent such as ammonium carbonate and ammonium phosphate may be added.

The polymerization initiator for the emulsion polymerization may be the one conventionally used in polymerization of TFE.

The polymerization initiator for the emulsion polymerization is preferably radical polymerization initiators, redox-type polymerization initiators, and the like.

Although the amount of the polymerization initiator is preferably low because the SSG of the resulting TFE polymer can be decreased, an extremely low amount tends to cause a reduced polymerization rate and an extremely high amount tends to cause an increased SSG of the resulting TFE polymer.

Examples of the radical polymerization initiator include water-soluble peroxides and the like, among which persulfates such as ammonium persulfate and potassium persulfate; permanganates such as potassium permanganate; and water-soluble organic peroxides such as disuccinic acid peroxide are preferred with ammonium persulfate being more preferred. One or two or more in combination of these compounds may be used.

The amount of the radical polymerization initiator may be appropriately selected according to the polymerization temperature and a target SSG, and is preferably 1 to 100 ppm, and more preferably from 1 to 20 ppm of the mass of the aqueous medium generally used.

When the radical polymerization initiator is used as the polymerization initiator, a TFE polymer having a low SSG can be obtained by adding a radical scavenger during the polymerization reaction.

Examples of the radical scavenger include unsubstituted phenols, polyhydric phenols, aromatic hydroxy compounds, aromatic amines, quinone compounds, and the like, among which hydroquinone is preferred.

The radical scavenger is preferably added before the polymerization of 50% by mass, and more preferably 30% by mass of the whole amount of TFE to be consumed during the polymerization reaction is completed, in order to obtain PTFE having a low SSG.

The amount of the radical scavenger is preferably 0.1 to 10 ppm of the aqueous medium generally used.

Examples of the redox-type polymerization initiator include a combination of a water-soluble oxidizing agent such as permanganates, e.g. potassium permanganate, persulfates, and bromates, and a reducing agent such as sulfites, bisulfites, oxalic acid, iron (II) chloride, and diimine. Among them, the combination of potassium permanganate and oxalic acid is preferred.

When the redox-type polymerization initiator is used as the polymerization initiator, a TFE polymer having a low SSG and high breaking strength can be obtained.

The amount of the redox polymerization initiator can be appropriately selected according to the polymerization temperature and a target SSG, and preferably corresponds to 1 to 100 ppm of the mass of the aqueous medium generally used.

Regarding the redox-type polymerization initiator, in order to obtain PTFE having a low SSG, addition of either of the oxidizing agent and reducing agent, preferably the oxidizing agent, is preferably halted in the middle of the polymerization reaction. The addition is preferably halted before the polymerization of 50% by mass, more preferably 30% by mass of the whole amount of TFE to be consumed during the polymerization reaction is completed.

The aqueous dispersion polymerization is preferably carried out in the presence of a dicarboxylic acid in an amount of 30 to 200 ppm relative to the aqueous medium, in order to reduce the amount of coagulated matter formed during polymerization reaction. The dicarboxylic acid may be added prior to the initiation of the polymerization reaction or during the polymerization reaction.

The dicarboxylic acid is preferably the one represented by the general formula: HOOCRCOOH, wherein R is an alkylene group having 1 to 5 carbon atoms. Among them, succinic acid, malonic acid, glutaric acid, adipic acid and pimelic acid are more preferred with succinic acid being further preferred.

The modifying monomer may be one intended to adjust the molding properties, extruding pressure and transparency and mechanical strength of molded articles.

A chain transfer agent may also be added in order to adjust the molecular weight and extrusion pressure. Examples of the chain transfer agent include hydrogen; hydrocarbons such as methane, ethane, and propane; halogenated hydrocarbons such as $CH_2CF_2$, $CH_3Cl$, $CH_2Cl_2$, and $C_2H_3Cl_2F$; and water-soluble organic compounds such as methanol and ethanol. It may be added at the beginning of the polymerization or during the polymerization depending on the purposes of addition thereof. It may be added at one time, sequentially or continuously.

The polymerization conditions such as temperature and pressure in the aqueous dispersion polymerization are not specifically limited and can be appropriately selected according to the amount of TFE used, the type and amount of the modifying monomer (s), the type and amount of the polymerization initiator(s), productivity, or the like. The temperature during the polymerization is preferably from 5 to 100° C., and more preferably from 50 to 90° C. The pressure during the polymerization is preferably from 0.1 to 3.9 MPa.

The polymerization reaction can be stopped by terminating the agitation when the concentration of the polymer latex produced reaches 20 to 45% by mass and discharging the monomers from the system.

The aqueous dispersion prepared in the step (1) may be diluted with water to a polymer concentration of 10 to 20% by mass.

When the aqueous dispersion is prepared by aqueous dispersion polymerization in the step (1), the steps (1) and (2) may be continuously performed.

The step (2) can be performed by agitating the aqueous dispersion prepared in the step (1) with a discharge flow-type impeller to coagulate polytetrafluoroethylene in the aqueous dispersion.

By applying a strong shear force to the PTFE aqueous dispersion obtained by emulsion polymerization of TFE (in which primary particles are dispersed in the aqueous medium), the primary particles are destabilized to aggregate, and simultaneously entrain the air, so that they are separated from water to give the PTFE fine powder (see Fluororesin Handbook ("Fusso Jushi Handbook"), ed. Takaomi Satokawa). The aggregate of the primary particles (fine powder) collected from the aqueous dispersion, i.e. the PTFE fine powder obtained by coagulation, has a large specific surface area as well as fibrillating properties. On the other hand, the powder obtained by granulating a powder obtained by suspension polymerization of TFE has a small specific surface area and has poor fibrillating properties. Thus, the step of agitating the aqueous dispersion of PTFE primary particles to effect coagulation is substantially different from the step of granulating a PTFE powder obtained by suspension polymerization both in terms of the objects to be agitated (materials) and of the products.

Figure 6:
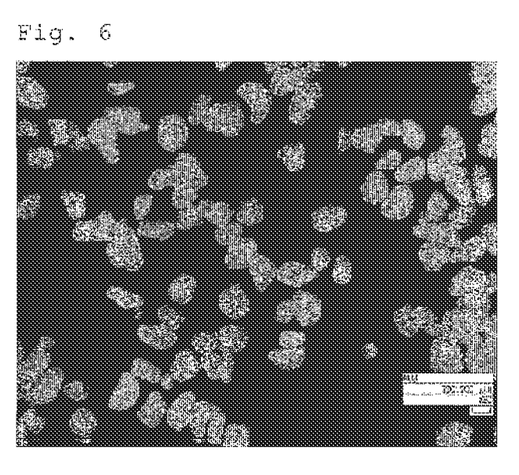
FIG. 6 is a microscope photograph of the resulting PTFE fine powder in Example 1, which has been passed through a mesh sieve of #60.

The discharge flow-type impeller can create an axial flow which allows the fine powder which has been rendered to be water-repellent by coagulation, to be easily entrained in water. Consequently, the fine powder becomes resistant to disruption and tends to be rolled on container walls. Thus, the fine powder is less compressed, so that aggregates of the fine powder may be easily disintegrated. In addition, the resulting powder may have a narrow shape distribution as shown in the photograph of FIG. 6.

The discharge flow-type impeller may be a cylinder-shaped or cone-shaped (truncated circular cone) impeller provided therein with a component that causes a flow as a shaft rotates. The component that induces a flow by agitation may be a conventional impeller of a paddle-, anchor-, ribbon-, or propeller-type, or the like, or may be a flat plate directly connected to the cylinder or cone. The cylinder or cone, when rotated, allows the component or directly connected plate for inducing a flow to create an axial flow, thereby agitating the content. Alternatively, the discharge flow-type impeller may be one in which guide plate(s) or a guide cylinder is/are installed around such an impeller as described above. The shape and number of the guide plates are not specifically limited. The guide cylinder preferably has a cylinder shape or truncated circular cone shape (cone). As the impeller is rotated, the guide plate (s) or guide cylinder allow (s) the impeller to create an axial flow, thereby agitating the content. Among these, the discharge flow-type impeller is preferably any of the cone-shaped impellers shown in FIG. 4.

Figure 4:
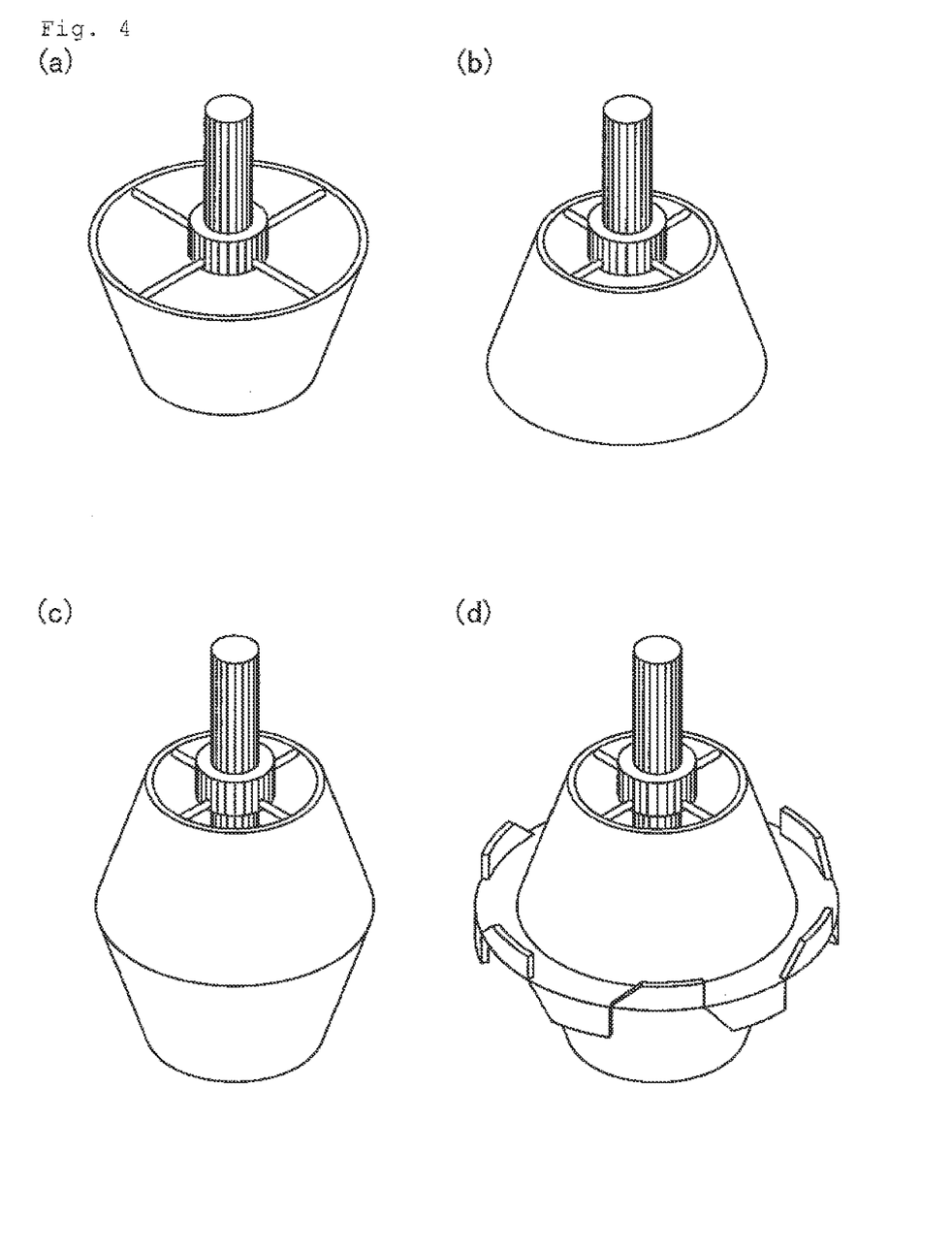
FIG. 4 is a schematic view of examples of cone-shaped impellers, in which (a) is an upward tapering cone-shaped impeller, (b) is a downward tapering cone-shaped impeller, (c) is a frontal coupling cone-shaped impeller, and (d) is a double cone-shaped impeller having a disc saw.

Examples of the cone-shaped impellers include an upward tapering cone-shaped impeller, a downward tapering cone-shaped impeller, a frontal coupling cone-shaped impeller, a double cone-shaped impeller having a disc saw and the like. FIG. 4 is a schematic view of examples of cone-shaped impellers, in which (a) is an upward tapering cone-shaped impeller, (b) is a downward tapering cone-shaped impeller, (c) is a frontal coupling cone-shaped impeller, and (d) is a double cone-shaped impeller having a disc saw.

Among cone-shaped impellers, downward type is more preferred.

A person skilled in the art can appropriately select the rotational speed of the agitation based on the size of containers, the shape of impellers and structure of baffle plates. It is well-known to a person skilled in the art that the agitation in the step (2) is generally needed to be more vigorous than the agitation in the aqueous dispersion polymerization. In general, when a strong shear force is applied to aqueous dispersions, primary PTFE particles are aggregated to form a wet powder in water via a state of slurry. The wet powder then becomes water repellent and is separated from water.

The rotational speed of the agitation is not limited, but may be generally from 50 to 1000 rpm.

The step (2) is also preferably the one in which coagulation is initiated by starting agitation after or at the same time of addition of a coagulant. The coagulant is preferably at least one selected from the group consisting of inorganic acids, inorganic salts and water-soluble organic compounds. Examples of the inorganic acids include hydrochloric acid, sulfuric acid, nitric acid, and the like. Examples of the inorganic salts include potassium nitrate, sodium nitrate, ammonium carbonate, sodium carbonate, aluminium nitrate, aluminium sulfate, magnesium nitrate, magnesium sulfate, ammonium hydrogen carbonate, sodium hydrogen carbonate, and the like. Examples of the water-soluble organic compounds include methanol, acetone, ethanol and the like.

In the step (2), the pH may optionally be adjusted. In the step (2), the temperature and specific gravity of the aqueous dispersion are preferably adjusted to from 0 to 80° C. and from 1.03 to 1.20, respectively. Before or during coagulation, a pigment for colouring and a filler for imparting conductivity and improved mechanical properties can also be added.

In the method of the present invention, a surfactant (B) may be added during the step (2). The step (2) may include the steps of (2-1) initiating coagulation of polytetrafluoroethylene in the aqueous dispersion by agitating the aqueous dispersion with a discharge flow-type impeller; (2-2) adding the surfactant (B) after (2-1); and (2-3) terminating the coagulation after (2-2).

Examples of the surfactant (B) include fluorine-containing surfactants such as fluorine-containing anionic surfactants, fluorine-containing nonionic surfactants, fluorine-containing cationic surfactants, and fluorine-containing betaine surfactants; and hydrocarbon-based surfactants such as hydrocarbon-based nonionic surfactants and hydrocarbon-based anionic surfactants.

Examples of the fluorine-containing anionic surfactants include the compounds represented by the general formula (1). Specific examples may include $CF_3(CF_2)_6COONH_4$, $CF_3(CF_2)_7COONa$, $H(CF_2CF_2)_4COONH_4$, and the like.

(1)

wherein $R^1$ is F or $CF_3$; $R^2$ is H, F, or $CF_3$, n is an integer of 4 to 20; m is 0 or an integer of 1 to 6; and $R^3$ is COOM or $SO_3M$, wherein M is H, $NH_4$, Na, K, or Li.

Examples of the fluorine-containing nonionic surfactants include the compounds represented by the general formula (2).

(2)

wherein $R^1$, $R^2$, n and m are as defined above; k is 0 or 1; $R^4$ is H, $CH_3$, or $OCOCH_3$; and $R^5$ is $(OCH_2CH_2)_pOR^6$, wherein p is 0 or an integer of 1 to 50; and $R^6$ is H, an alkyl group having 1 to 20 carbon atoms, or an aromatic group having 6 to 26 carbon atoms.

Examples of the fluorine-containing cationic surfactants include the compounds represented by the above general formula (2), wherein $R^5$ is the group represented by the formula (3).

(3)

Examples of the fluorine-containing betaine surfactants include the compounds represented by the above general formula (2), wherein $R^5$ is the group represented by the formula (4).

(4)

Examples of the hydrocarbon-based nonionic surfactants include polyoxyethylene alkyl ethers, polyoxyethylene alkyl esters, polyoxyethylene alkylphenyl ethers, sorbitan alkylates, polyoxyethylene sorbitan monoalkylates, and the like.

Examples of the hydrocarbon-based anionic surfactants include alkyl carboxylates, alkyl sulfonates, alkyl sulfates, alkyl benzene sulfonates, alkyl phosphonates, alkyl phosphates, and the like.

The surfactant (B) is preferably a nonionic surfactant and more preferably a hydrocarbon-based nonionic surfactant because it can contribute to effects with a small amount.

The amount of the surfactant (B) used is preferably 1 ppm to 10% by mass relative to the polymer solid matter in the PTFE aqueous dispersion. When the amount of the surfactant (B) is too small, the PTFE fine powder having superior handling characteristics may not be obtained, and when the amount of the surfactant (B) is too high, the surfactant (B) tends to remain in the fine powder to stain the same. The lower limit of the amount of the surfactant (B) used is more preferably 50 ppm and the upper limit is more preferably 10000 ppm.

In the step (2-1), the surfactant (B) is preferably added after the primary particles of the PTFE are aggregated to form a slurry. If the surfactant is entrained in the fine powder, reduction of the effects of addition of the surfactant and coloration of the fine powder and molded articles tend to occur. However, when the surfactant (B) is added at this time, the surfactant in a small amount can deliver desired effects of the present invention. Due to the same reason, the surfactant (B) is more preferably added after the wet powder of the PTFE is formed. It is preferably added immediately before or after the wet powder becomes water repellent and is separated from water. It is more preferable that it is added immediately before the wet powder becomes water repellent and is separated from water.

In the step (2-2), the coagulation can be terminated by halting the agitation. The coagulation is preferably terminated after confirming that the resulting liquid is no longer in a slurry state and the water phase is transparent enough to see through. The coagulation is preferably terminated after the agitation is continued for 30 seconds or more, preferably 1 min or more, and more preferably 3 min or more after water is separated (after water is repelled).

The method of the present invention includes the step (3) of collecting a wet powder of the PTFE. The wet powder of the polytetrafluoroethylene can be collected by filtering off the wet powder of the PTFE from the mixture of the PTFE coagulation particles, water, and the surfactant (B), obtained in the step (2).

It is also possible to find when the surfactant is to be added and when the coagulation is to be terminated by monitoring change in torque or change in sound during the coagulation.

The method of the present invention may include the step of washing the wet powder of the PTFE obtained in the step (2). The washing can be carried out by adding water and the surfactant (B) to the wet powder, keeping agitation until the PTFE particles repel water, and collecting the wet powder of the PTFE. The handling characteristics of the PTFE fine powder can be further improved when the above agitation is carried out at 30 to 90° C. The temperature for the above agitation is more preferably 30 to 60° C.

The method of the present invention includes the step (4) of drying the wet powder of the PTFE.

The drying is preferably carried out with little flow of the wet powder of the PTFE and by heating means such as hot air, which can be combined with reduced pressure or vacuum. The temperature for drying may be below the melting point of the polymer and is usually suitable in the range of 100 to 300° C. The drying temperature is preferably 180° C. or more and below 300° C.

The drying conditions may affect paste extrusion performances. The paste extrusion pressure tends to be increased with increased drying temperature. The friction of the powder, especially at high temperature, is liable to cause adverse effects on the properties of the fine powder because the fine powder is easily fibrillated with a small shear force and loses its original particle structures to result in decreased paste extrusion performances.

The method of the present invention makes it possible to produce PTFE fine powders having the following properties:

(1) A PTFE fine powder consisting of a TFE homopolymer and having an SSG of 2.160 to 2.230; an average particle size of 300 to 800 μm; an apparent density of 0.40 to 0.52 g/ml; a compression ratio of 1.20 or less; and an aggregate disintegration degree with 50-sec vibration of 60% or more. The compression ratio of the PTFE fine powder is preferably 1.15 or less. The aggregate disintegration degree with 50-sec vibration is preferably 70% or more.

(2) A PTFE fine powder consisting of a TFE homopolymer and having an SSG of 2.130 to 2.160, an average particle size of 300 to 800 μm; an apparent density of 0.40 to 0.52 g/ml; a compression ratio of 1.20 or less; and an aggregate disintegration degree with 50-sec vibration of 50% or more. The compression ratio of the PTFE fine powder is preferably 1.15 or less.

(3) A PTFE fine powder consisting of a modified PTFE and having an SSG of 2.140 to 2.230; an extrusion pressure of 80 MPa or less at a RR1500 in presence of 20.5 parts by mass of ISOPAR G; an average particle size of 300 to 800 μm; an apparent density of 0.40 to 0.52 g/ml; a compression ratio of 1.20 or less; and an aggregate disintegration degree with 50-sec vibration of 70% or more. The extrusion pressure of the PTFE fine powder is preferably 70 MPa or less.

(4) A PTFE fine powder consisting of a modified PTFE and having an SSG of 2.140 to 2.230; an extrusion pressure of 60 MPa or less at a RR1500 in presence of 20.5 parts by mass of ISOPAR G; an average particle size of 300 to 800 μm; an apparent density of 0.40 to 0.52 g/ml; a compression ratio of 1.20 or less; and an aggregate disintegration degree with 50-sec vibration of 70% or more.

The PTFE fine powder obtained according to the present method preferably has an average particle size of 300 to 800 μm, and more preferably 400 to 700 μm.

The PTFE fine powder obtained according to the present method preferably has an apparent density of 0.40 to 0.52 g/ml, and more preferably 0.45 to 0.52 g/ml.

The standard specific gravity (SSG) is measured in conformity with ASTM D 4895-89.

The apparent density is measured in conformity with JIS K6892.

The average particle size is measured in conformity with JIS K6891.

The compression ratio is measured at 25° C. in accordance with the procedures (1) to (6) shown below:

(1) A round-shaped powder paper (diameter: 50 mm) is placed at the bottom of a SUS cylindrical cup (inner diameter: 50 mm (measured value: 51.7 mm), volume: 150 ml). The inner side surface of the cup is also covered with a powder paper.

(2) The PTFE fine powder is sieved with a 10-mesh sieve, and 50 g of the material passing through the sieve is sampled and placed in the cylindrical cup.

(3) The surface of the PTFE fine powder in the cylindrical cup is smoothened and covered with a round-shaped powder paper (diameter: 50 mm).

(4) A weight (a cylinder having a diameter of 50 mm, weight: 330 g) is placed on the powder paper on the surface, and is tapped for 20 times on Powder Tester (Hosokawa Micron Corporation) (tapping stroke: 20 mm).

(5) After tapping, a cylindrical cake of the PTFE fine powder is taken out from the cylindrical cup and the height thereof is measured with a caliper.

(6) The apparent density of the cake is calculated from the cross-section area and height of the cake and the compression ratio is calculated from the following equation (A):

$$\text{(Compression ratio)}=\text{(Apparent density of cake)}/\text{(Apparent density of PTFE fine powder)} \quad (A),$$

wherein the apparent density of the PTFE fine powder is measured in conformity with JIS K6892, as described above.

The aggregate disintegration degree with 50-sec vibration is measured at 25° C. according to the following procedures (1) to (7):

(1) A round-shaped powder paper (diameter: 50 mm) is placed at the bottom of a SUS cylindrical cup (inner diameter: 50 mm (measured value: 51.7 mm), volume: 150 ml). The inner side surface of the cup is also covered with a powder paper.

(2) The PTFE fine powder is sieved with a 10-mesh sieve, and 50 g of the material passing through the sieve is sampled and placed in the cylindrical cup.

(3) The surface of the PTFE fine powder in the cylindrical cup is smoothened and covered with a round-shaped powder paper (diameter: 50 mm).

(4) A weight (a cylinder having a diameter of 50 mm, weight: 330 g) is placed on the powder paper on the surface, and is tapped for 20 times in Powder Tester (Hosokawa Micron Corporation) (tapping stroke: 20 mm).

(5) After tapping, a cylindrical cake of the PTFE fine powder is taken out from the cylindrical cup.

(6) The cylindrical cake taken out is placed on a 8-mesh sieve and subjected to vibration for 50 seconds on Powder Tester (Hosokawa Micron Corporation) (vibration scale: 4.5).

(7) The mass of the PTFE fine powder dropped by vibration is weighed and the aggregate disintegration degree is calculated from the following equation (B):

$$\text{(Aggregate disintegration degree)}=\text{(Mass of PTFE fine powder passed through the sieve during 50-second vibration)}/\text{(Total mass of PTFE fine powder)} \times 100 (\% \text{ by mass}) \quad (B)$$

The extrusion pressure at a reduction ratio of 1500 (RR1500) is measured according to the following procedures: The PTFE fine powder (50 g) and 10.25 g of an extrusion aid, hydrocarbon oil (trade name: ISOPAR G, Exxon Mobil Corporation) were mixed in a glass bottle and aged at room temperature (25±2° C.) for 1 hour. The mixture was charged in an extrusion die (reduction angle: 30°; equipped with an orifice (diameter: 0.65 mm, length: 2 mm) on its lower end) equipped with a cylinder (inner diameter: 25.4 mm). A load of 1.2 MPa was applied to a piston in the cylinder and maintained for 1 min, immediately followed by extrusion of the mixture from the orifice at room temperature at a ram speed of 20 ram/min to obtain a rod-shaped material. The pressure to the mixture is measured in a period in which the pressure is stable in the latter half of the extrusion. This pressure is divided by the cross-sectional area of the cylinder, and the obtained value is used as the extrusion pressure.

EXAMPLES

The present invention is now illustrated in further detail in reference to the following examples. However, the present invention is not limited merely to these examples.

The data shown in the examples were obtained according to the following measurement methods.

1. Average particle size of secondary particles (fine powder)

It was measured in conformity with JIS K6891.

2. Apparent density

It was measured in conformity with JIS K6892.

3. Standard specific gravity (SSG)

It was measured in conformity with ASTM D 4895-89.

4. Modifier Content

The modifier content in a polymer (% by weight) was determined from infrared absorption spectral bands of a polymer sample.

Chlorotrifluoroethylene

The value obtained by multiplying 0.58 by the ratio of the absorption value at 957 $cm^{-1}$ (peak height) to the absorption value at 2360 $cm^{-1}$ Perfluoropropylvinylether (JP 2005-298581 A)

The value obtained by multiplying 0.14 by the ratio of the absorption value at 995 $cm^{-1}$ to the absorption value at 935 $cm^{-1}$ Hexafluoroethylene (JP 2005-298581 A)

Figure 1:
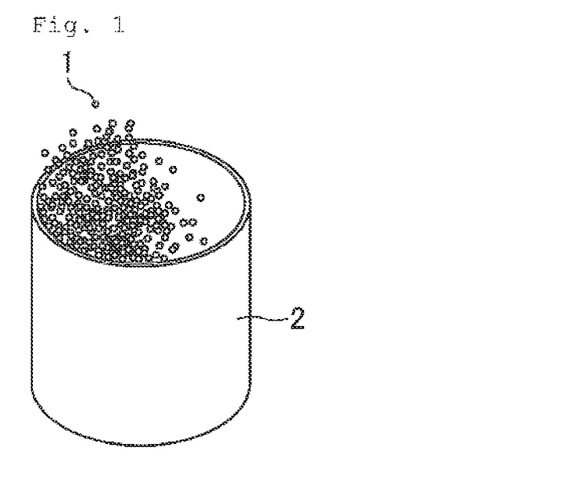
FIG. 1 shows a step in the measurement of the compression ratio and aggregate disintegration degree.
Figure 2:
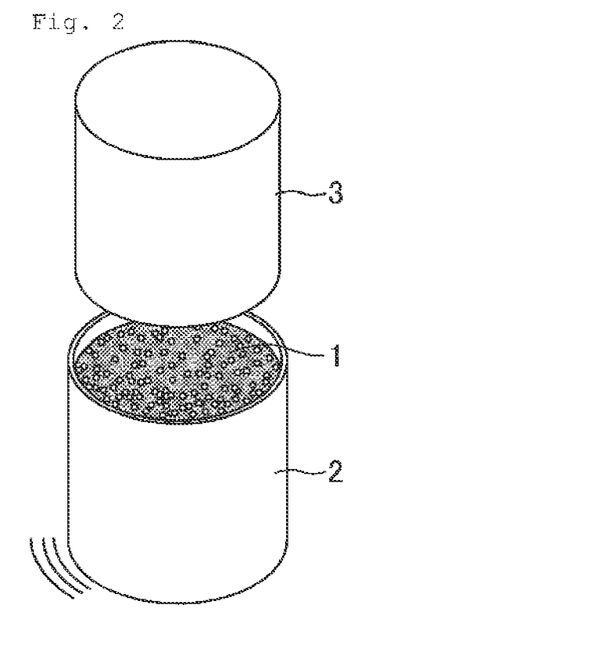
FIG. 2 shows another step in the measurement of the compression ratio and aggregate disintegration degree.
Figure 3:
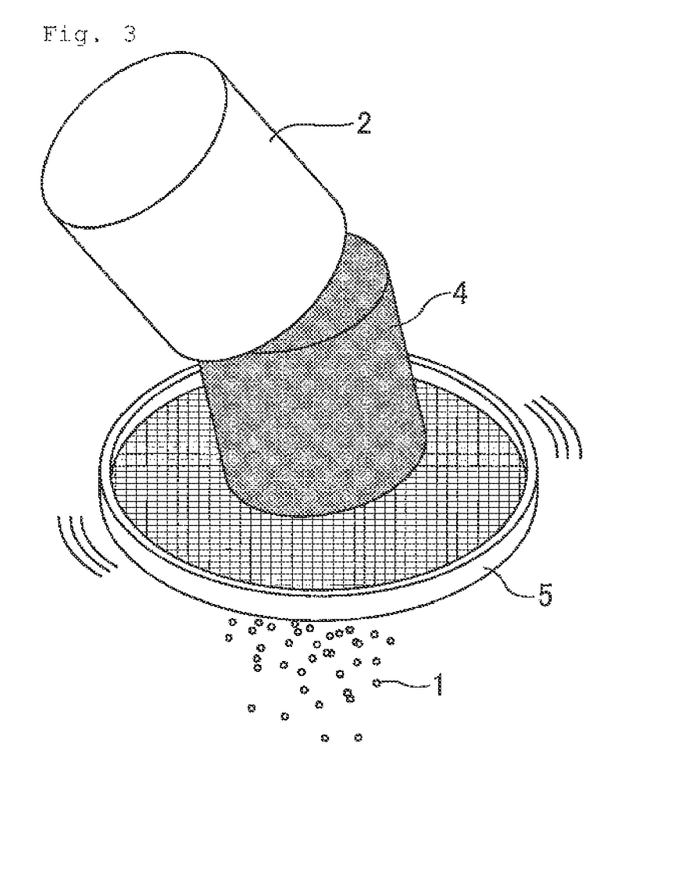
FIG. 3 shows still another step in the measurement of the compression ratio and aggregate disintegration degree.

The value obtained by multiplying 0.3 by the ratio of the absorption value at 983 $cm^{-1}$ to the absorption value at 935 $cm^{-1}$ 5. Compression ratio The compression ratio was measured on Powder Tester (Hosokawa Micron Corporation) at 25° C. FIGS. 1 to 3 give an overview of the measurement of the compression ratio. A round-shaped powder paper (diameter: 50 mm) was placed at the bottom of a SUS cylindrical cup 2 (inner diameter: 50 mm (measured value: 51.7 mm), volume: 150 ml). The inner side surface of the cup was also covered with a powder paper. The PTFE fine powder 1 was sieved with a 10-mesh sieve, and 50 g of the material passing through the sieve was sampled and placed in the cylindrical cup 2 as shown in FIG. 1. The surface of the powder was smoothened and covered with a round-shaped powder paper (diameter: 50 mm). As shown in FIG. 2, a weight 3 (a cylinder having a diameter of 50 mm, weight: 330 g) was placed on the powder paper, and was tapped for 20 times on Powder Tester (tapping stroke: 20 mm). After tapping, a cylindrical cake 4 of the PTFE fine powder was taken out from the cylindrical cup 2 and the height thereof was measured with a calliper, as shown in FIG. 3. The apparent density was calculated from the cross-section area and height of the cake. The compression ratio was calculated from the following equation:

(Compression ratio)=(Apparent density of cake)/(Apparent density of PTFE fine powder)

The compression ratio is preferred to be as close as 1, which indicates that the PTFE fine powder is less cohesive and has superior handling characteristics.

6. Aggregate disintegration degree

The aggregate disintegration degree was measured at 25° C. The vibration strength was preliminarily adjusted so that the vibration scale of 5.5 corresponds to the amplitude of 1 mm. As shown in FIG. 3, the cylindrical cake 4 was placed on a 8-mesh sieve 5 and subjected to vibration on Powder Tester (Hosokawa Micron Corporation) (vibration scale: 4.5). The mass of the PTFE fine powder 1 dropped due to vibration was measured every 5 seconds and the aggregate disintegration degree was calculated from the following equation:

(Aggregate disintegration degree)=(Mass of PTFE fine powder passed through the sieve due to vibration)/(Total mass of PTFE fine powder)× 100(% by mass).

The aggregate disintegration degree is preferred to be high, which indicated that the powder is more easily unraveled and better in handling characteristics.

7. Paste extrusion pressure

A PTFE fine powder (50 g) and 10.25 g of an extrusion aid, hydrocarbon oil (trade name: ISOPAR G, Exxon Mobil Corporation) were mixed in a glass bottle and aged at room temperature (25±2° C.) for 1 hour. The mixture was charged in an extrusion die (drawing angle: 30°; equipped with an orifice (diameter: 0.65 mm, length: 2 mm) on its lower end) equipped with a cylinder (inner diameter: 25.4 mm). A load of 1.2 MPa was applied to a piston in the cylinder and maintained for 1 min, immediately followed by extrusion of the mixture from the orifice at room temperature at a ram speed of 20 mm/min to obtain a rod-shaped material. The pressure to the mixture is measured in a period in which the pressure is stable in the latter half of the extrusion. This pressure is divided by the cross-sectional area of the cylinder, and the obtained value is used as the extrusion pressure.

Polymerization Example 1

To a 6-L stainless steel (SUS316) autoclave equipped with a stainless steel (SUS316) anchor-type impeller and a thermostat jacket were added 3460 g deionized water, 100 g paraffin wax and 5.25 g ammonium perfluorooctanoate, and the autoclave was heated to 85° C. while removing oxygen from the system by purging three times with nitrogen gas and twice with TFE gas. The inner pressure was then brought to 0.70 MPa with TFE gas and the agitation speed of 250 rpm and the inner temperature of 85° C. were maintained.

After the temperature in the polymerization vessel was stabilized, an aqueous solution of 15 mg ammonium persulfate in 20 g deionized water and an aqueous solution of 260 mg disuccinic acid peroxide in 20 g deionized water were pressed therein with TFE and the inner pressure of the autoclave was brought to 0.80 MPa. The reaction proceeded at an elevated rate, while the reaction temperature and agitation were maintained at 85° C. and 250 rpm, respectively. The inner pressure of the autoclave was always kept at 0.80 MPa with the continuous feed of TFE.

When 1130 g of TFE was consumed, agitation and feeding of TFE were stopped, and gas in the autoclave was immediately released to ordinary pressure to terminate the reaction.

The resulting PTFE aqueous dispersion had a solids content of 24.3% by mass, an average primary particle size of 0.32 μm, and a standard specific gravity (SSG) of 2.177.

Comparative Example 1

The PTFE aqueous dispersion obtained in Polymerization Example 1 was combined with deionized water to adjust the specific gravity to 1.080 g/ml (25° C.). To a 17-L stainless steel coagulation vessel equipped with an anchor-type impeller and a baffle plate was added 8.0 L of the PTFE aqueous dispersion whose specific gravity had been adjusted, and the temperature of the liquid was controlled to 22° C. Immediately after the adjustment of temperature, 6 ml nitric acid (60%) was added and, at the same time, agitation at 400 rpm was initiated. After initiation of agitation, the aqueous dispersion underwent a change into a slurry and then a wet powder was formed. Agitation was then continued for 1 min.

The wet polymer powder was then filtered off and was charged into the coagulation vessel with 7.0 L deionized water. The temperature was adjusted to 25° C. and the polymer powder was washed twice at an agitation speed of 400 rpm. After washing, the wet polymer powder was filtered off, and left in a hot air circulation dryer at 155° C. for 18 hours to give a PTFE fine powder.

Figure 5:
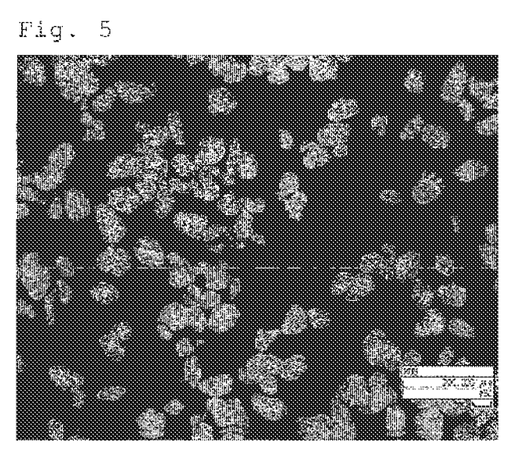
FIG. 5 is a microscope photograph of the resulting PTFE fine powder in Comparative Example 1, which has been passed through a mesh sieve of #60.

The average particle size, apparent density, compression ratio and aggregate disintegration degree of the resulting PTFE fine powder were determined. The results are shown in Table 1. FIG. 5 shows a microscope photograph of the resulting PTFE fine powder in Comparative Example 1, which has been passed through a mesh sieve of #60.

Example 1

To the PTFE aqueous dispersion obtained in Polymerization Example 1 was added deionized water to adjust the specific gravity to 1.080 g/ml (25° C.). The adjusted PTFE aqueous dispersion (10.0 L) was placed in a 17-L stainless steel coagulation vessel equipped with a downward tapering cone-shaped impeller and a baffle plate, and the temperature of the liquid was controlled to 22° C. Immediately after the adjustment of temperature, 7.5 ml nitric acid (60%) was added and, at the same time, agitation at 600 rpm was initiated. After initiation of agitation, the aqueous dispersion underwent a change into a slurry and wet powder was formed. Agitation was then continued for 3 min.

The wet polymer powder was then filtered off and was charged into the coagulation vessel with 8.5 L deionized water. The temperature was adjusted to 25° C. and the polymer powder was washed twice at an agitation speed of 600 rpm. After washing, the wet polymer powder was filtered off, and left in a hot air circulation dryer at 155° C. for 18 hours to give a PTFE fine powder.

The average particle size, apparent density, compression ratio and aggregate disintegration degree of the resulting PTFE fine powder were determined. The results are shown in Table 1. FIG. 6 shows a microscope photograph of the resulting PTFE fine powder in Example 1, which has been passed through a mesh sieve of #60.

Example 2

A PTFE fine powder was obtained in the same manner as Example 1 except that the temperature during washing was changed to 40° C. The average particle size, apparent density, compression ratio and aggregate disintegration degree of the resulting PTFE fine powder were determined. The results are shown in Table 1.

Polymerization Example 2

A PTFE aqueous dispersion was obtained by the polymerization reaction according to Example 5 of WO 2007/119829.

The resulting PTFE aqueous dispersion had a solids content of 31.4% by mass, an average primary particle size of 0.35 μm, and a standard specific gravity (SSG) of 2.160.

Comparative Example 2

A PTFE fine powder was obtained in the same manner as Comparative Example 1 except that the PTFE aqueous dispersion obtained in Polymerization Example 2 was used in lieu of the PTFE aqueous dispersion obtained in Polymerization Example 1 and that the temperature during coagulation and the temperature during drying were changed to 21° C. and 210° C., respectively. The average particle diameter, apparent density, compression ratio and aggregate disintegration degree of the resulting PTFE fine powder were determined. The results are shown in Table 1.

Example 3

A PTFE fine powder was obtained in the same manner as in Example 1 except that the PTFE aqueous dispersion obtained in Polymerization Example 2 was used in lieu of the PTFE aqueous dispersion obtained in Polymerization Example 1, that the temperature during coagulation was changed to 21° C., and that the temperature during drying was changed to 210° C. The average particle diameter, apparent density, compression ratio and aggregate disintegration degree of the resulting PTFE fine powder were determined. The results are shown in Table 1.

Polymerization Example 3

To a 6-L stainless steel (SUS316) autoclave equipped with a stainless steel (SUS316) anchor-type impeller and a thermostat jacket were added 2960 g deionized water, 120 g paraffin wax, and 4.4 g ammonium perfluorooctanoate, and the autoclave was heated to 85° C. while removing oxygen from the system by purging three times with nitrogen gas and twice with TFE gas. The inner pressure was then brought to 0.70 MPa with TFE gas, and 0.26 g chlorotrifluoroethylene (CTFE) was added. The inner temperature was maintained at 85° C. with agitation at 280 rpm.

After the temperature in the polymerization vessel was stabilized, an aqueous solution of 12.3 mg ammonium persulfate in 20 g deionized water and an aqueous solution of 180 mg disuccinic acid peroxide in 20 g deionized water were pressed therein with TFE and the inner pressure of the autoclave was brought to 0.78 MPa. The reaction proceeded at an elevated rate, while the reaction temperature and agitation were maintained at 85° C. and 280 rpm, respectively. The inner pressure of the autoclave was always kept at 0.78 MPa with the continuous feed of TFE.

When 1300 g of TFE was consumed, a solution of 3.5 g CTFE from a small stock tank was pressed in the autoclave with TFE, and the reaction was continued, with TFE being fed.

When 1430 g of TFE was consumed, agitation and feeding of TFE were stopped, and gas in the autoclave was immediately released to ordinary pressure to terminate the reaction.

The resulting PTFE aqueous dispersion had a solids content of 32.2% by mass, an average primary particle size of 0.24 μm, a standard specific gravity (SSG) of 2.177, and an amount of the modifying CTFE units in the polymer of 0.23% by weight.

Comparative Example 3

A PTFE fine powder was obtained in the same manner as in Comparative Example 1 except that the PTFE aqueous dispersion obtained in Polymerization Example 3 was used in lieu of the PTFE aqueous dispersion obtained in Polymerization Example 1, that the temperature of coagulation was changed to 30° C., and that nitric acid was not added. The average particle diameter, apparent density, compression ratio and aggregate disintegration degree of the resulting PTFE fine powder were determined. The results are shown in Table 1.

Example 4

A TFE fine powder was obtained in the same manner as Example 1 except that the PTFE aqueous dispersion obtained in Polymerization Example 3 was used in lieu of the PTFE aqueous dispersion obtained in Polymerization Example 1, that the temperature of coagulation was changed to 30° C., that nitric acid was not added, and that the agitation time after water was repelled was changed to 1 min. The average particle diameter, apparent density, compression ratio and aggregate disintegration degree of the resulting PTFE fine powder were determined. The results are shown in Table 1.

3 Weight
4 Cylindrical cake of polytetrafluoroethylene fine powder
5 Sieve

The invention claimed is:

1. A method for manufacturing a polytetrafluoroethylene fine powder,

TABLE 1

| Starting aqueous dispersion | | Comparative Example 1 Polymerization Example 1 | Example 1 Polymerization Example 1 | Example 2 Polymerization Example 1 | Comparative Example 2 Polymerization Example 2 | Example 3 Polymerization Example 2 | Comparative Example 3 Polymerization Example 3 | Example 4 Polymerization Example 3 |
|---|---|---|---|---|---|---|---|---|
| Impeller | | Anchor | Cone (downward) | Cone (downward) | Anchor | Cone (downward) | Anchor | Cone (downward) |
| Adjusted specific graviy | | 1.080 g/ml | 1.080 g/ml | 1.080 g/ml | 1.080 g/ml | 1.080 g/ml | 1.080 g/ml | 1.080 g/ml |
| Liquid volume | | 8 L | 10 L | 10 L | 8 L | 10 L | 8 L | 10 L |
| Coagulation temperature | | 22° C. | 22° C. | 22° C. | 21° C. | 21° C. | 30° C. | 30° C. |
| Agitation speed | | 400 rpm | 600 rpm | 600 rpm | 400 rpm | 600 rpm | 400 rpm | 600 rpm |
| Nitric acid added | | 6 ml | 7.5 ml | 7.5 ml | 6 ml | 7.5 ml | — | — |
| Duration of agitation after water was repelled | | 1 min. | 3 min. | 3 min. | 1 min. | 3 min. | 1 min. | 1 min. |
| Washing conditions | Temperature of washing water | 25° C. | 25° C. | 40° C. | 25° C. | 25° C. | 25° C. | 25° C. |
| | Liquid volume | 7 L | 8.5 L | 8.5 L | 7 L | 8.5 L | 7 L | 8.5 L |
| | Rotational speed of agitation | 400 rpm | 600 rpm | 600 rpm | 400 rpm | 600 rpm | 400 rpm | 600 rpm |
| | Washing time | 1 min. | 1 min. | 1 min. | 1 min. | 1 min. | 1 min. | 1 min. |
| | Washing frequency | 2 times | 2 times | 2 times | 2 times | 2 times | 2 times | 2 times |
| Drying temperature | | 155° C. | 155° C. | 155° C. | 210° C. | 210° C. | 155° C. | 155° C. |
| Apparent density (g/ml) | | 0.473 | 0.477 | 0.453 | 0.503 | 0.507 | 0.493 | 0.483 |
| Average particle size (μm) | | 480 | 570 | 560 | 570 | 580 | 500 | 540 |
| Height of cake (cm) | | 4.01 | 4.29 | 4.62 | 4.00 | 4.16 | 3.940 | 4.105 |
| Apparent density of aggregate cake (g/ml) | | 0.594 | 0.556 | 0.516 | 0.596 | 0.573 | 0.605 | 0.581 |
| Compression ratio | | 1.26 | 1.16 | 1.14 | 1.18 | 1.13 | 1.23 | 1.20 |
| Extrusion pressure at RR 1500 (MPa) | | — | — | — | — | — | 49 | 50 |
| Aggregate | Vibration time (sec) | (Mass of fine powder passed through a sieve)/(Total mass of fine powder) × 100 (% by mass) | | | | | | |
| disintegration degree | 0 | 0.0 | 0.0 | 0.0 | 0.0 | 0.0 | 0.0 | 0.0 |
| | 5 | 1.8 | 11.2 | 16.6 | 5.8 | 8.6 | 5.6 | 13.2 |
| | 10 | 7.6 | 14.0 | 28.4 | 12.8 | 13.8 | 14.0 | 23.6 |
| | 15 | 11.4 | 17.2 | 39.0 | 17.2 | 16.8 | 23.4 | 36.0 |
| | 20 | 15.4 | 20.6 | 50.6 | 20.6 | 19.0 | 24.6 | 47.0 |
| | 25 | 18.0 | 26.0 | 59.2 | 22.6 | 23.0 | 29.0 | 56.0 |
| | 30 | 19.4 | 36.4 | 65.0 | 25.2 | 35.2 | 36.8 | 61.4 |
| | 40 | 23.0 | 50.6 | 73.8 | 32.4 | 44.0 | 41.8 | 70.8 |
| | 50 | 26.2 | 60.6 | 80.8 | 38.0 | 53.8 | 47.8 | 76.0 |
| | 60 | 29.2 | 68.4 | 85.4 | 44.0 | 59.0 | 48.0 | 80.0 |
| | 70 | 31.4 | 73.0 | 88.0 | 47.8 | 63.4 | 52.2 | 83.6 |
| | 80 | 33.0 | 76.6 | 90.2 | 51.0 | 68.0 | 55.8 | 85.6 |
| | 90 | 34.8 | 80.0 | 92.0 | 54.6 | 72.2 | 58.0 | 87.4 |
| | 100 | 36.4 | 83.0 | 93.2 | 57.6 | 76.0 | 60.2 | 88.0 |
| | 110 | 37.8 | 85.6 | 94.2 | 59.8 | 79.0 | 62.2 | 90.0 |
| | 120 | 38.8 | 88.0 | 94.8 | 62.0 | 82.2 | 63.6 | 91.0 |

INDUSTRIAL APPLICABILITY

The production method of the present invention is suitably applicable as a method for manufacturing a PTFE fine powder having superior handling characteristics. The obtained PTFE fine powder can be molded to sealing materials, filters, tubes, pipes, wire-coatings and the like by paste extrusion or calendering. The obtained PTFE fine powder can also be suitably applied for materials for stretch films, materials for porous articles, processing aids, anti-drip agents, unsintered tape, binders for batteries and the like.

REFERENCE SIGNS LIST

1 Polytetrafluoroethylene fine powder
2 Cylindrical cup the method comprising the steps of:
(1) preparing an aqueous dispersion comprising polytetrafluoroethylene, water, and a surfactant (A);
(2) coagulating the polytetrafluoroethylene in the aqueous dispersion by agitating the aqueous dispersion with a discharge flow-type impeller;
(3) collecting a wet powder of the polytetrafluoroethylene; and
(4) drying the wet powder of the polytetrafluoroethylene.

2. The method according to claim 1, wherein the discharge flow-type impeller is a cone-shaped impeller.

3. The method according to claim 1, wherein the discharge flow-type impeller is a downward tapering cone-shaped impeller.

* * * * *